July 18, 1939.   F. M. CLOTHIER, JR., ET AL   2,166,129
POLYMERIZATION OF HYDROCARBON GASES
Filed Sept. 27, 1935

Inventors
Fred M. Clothier, Jr.
Hugh W. Field
By T. Wallace Quinn
their Attorney Patented July 18, 1939

2,166,129

UNITED STATES PATENT OFFICE 2,166,129

POLYMERIZATION OF HYDROCARBON GASES

Fred M. Clothier, Jr., Lansdowne, and Hugh W. Field, Glen Mills, Pa., assignors to The Atlantic Refining Company, Philadelphia, Pa., a corporation of Pennsylvania Application September 27, 1935, Serial No. 42,408

4 Claims. (Cl. 196—10)

The present invention relates to a process for polymerizing fractions of normally gaseous mixtures containing unsaturated hydrocarbons. More particularly, our invention relates to forming from fractions of such mixtures liquid polymers, which, for example, may be blended with gasoline to form a product of enhanced anti-detonation characteristics. This application is a continuation in part of our copending application, Serial No. 673,374, filed May 29, 1933.

In accordance with our invention, fractions of gaseous mixtures containing unsaturated hydrocarbons having four carbon atoms to the molecule, are segregated and polymerized. Natural gas, petroleum refinery gas, and/or gaseous products resulting from the cracking of petroleum or fractions thereof, are sources of material which may be treated by our process.

It has heretofore been customary to polymerize only the residual gases from which have been separated the light and heavy petroleum liquids, which, for example, are suitable for blending to form a motor fuel. The light and heavy liquids so separated, contain substantial amounts of dissolved and/or condensed gases, and these gases, heretofore, have not been available for polymerization.

It is a particular object of our invention to substantially completely separate from petroleum liquids, such as those within the motor fuel boiling range, all of their gaseous content, and to subject that portion of the gases which may be economically polymerized to suitable polymerizing conditions, thereby to convert the gases into liquid products of enhanced value.

Illustrative of an embodiment of our invention is the following:

Light and heavy naphthas from cracking still and other distillates are first rendered substantially butane and butene free. In accomplishing this, the residual gases first obtained, in addition to butanes and butenes, contain hydrocarbons of two and three carbon atoms to the molecule, methane, hydrogen, and water. From this mixture, water and hydrocarbons containing three carbon atoms to the molecule and lighter materials are separated and removed from the system, and the heavier gases are subjected to polymerizing conditions, for example, by passage into contact with sulfuric acid of suitable concentration. Then the portion of such heavier gases which remains unpolymerized is removed from the portion which has been polymerized, and each portion is disposed of in accordance with the desire of the refiner.

We have found that by our process, the amount of unsaturated $C_4$ hydrocarbons available for polymerization is very materially increased. For example, when operating in accordance with the conventional method hereinbefore outlined, the concentration of unsaturated $C_4$ hydrocarbons is of the order of from about 15 to 25 mol. per cent, whereas when our process is employed, the increase in concentration of such hydrocarbons is of the order of from 35 to 45 mol. per cent, or in other words, an increase of approximately 100%. Such increase in concentration is reflected in a proportionate increase in the yield of the desirable polymerized products.

We prefer to effect polymerization of the unsaturated hydrocarbons by the employment of catalysts, such, for example, as sulfuric acid of a concentration of from about 60 to 90% strength. Examples of other catalysts which may be employed, are, phosphoric acid, tin tetrachloride, and zinc chloride. In lieu of or in addition to effecting polymerization by means of catalysts, thermal treatment at atmospheric or higher pressure may be employed to effect or assist in effecting the conversion.

Herein, when hydrocarbons are referred to as $C_2$, $C_3$, $C_4$, and/or $C_5$, it is to be understood that such hydrocarbons contain respectively 2, 3, 4, and 5 carbon atoms to the molecule.

For a further understanding of our invention reference is had to the accompanying drawing which illustrates diagrammatically an arrangement of apparatus suitable for carrying out our process.

A petroleum distillate containing gasoline and gases, for example, the overhead from a fractionating tower of a cracking still, is introduced under still pressure, e. g., 35 lbs. per sq. inch, and at a temperature of the order of 80° F., through pipe 1 into separator 2. The distillate containing those gases which remain dissolved therein, is passed from the bottom of separator 2 through line 3, thence by means of pump 4, through pipe 5, valve 6, and pipe 7 into stripping column or de-butanizer 8. Such column is provided at its lower end with a reboiling coil 9, and operates at a temperature at its lower end of approximately 350° F., and under a pressure of the order of 90 lbs. per sq. in. In this column, the cracked gasoline is substantially completely stripped of lighter materials, that is, of hydrocarbons and gases lighter than $C_5$ hydrocarbons. The "de-butanized" gasoline is withdrawn from the bottom of column 8 through pipe 10 controlled by valve 11, whereupon it may be passed to storage (not shown), or the "de-butanized" gasoline may be blended with polymers and butane, as will be hereinafter described. The material so withdrawn is a stable pressure distillate substantially free from $C_4$ hydrocarbons and lighter materials. The uncondensed gases comprising $C_4$, $C_3$, and $C_2$ hydrocarbons, methane, hydrogen and water, pass from the top of column 8 through line 12, condenser 13 and pipe 14, into mix tank 15.

The stripping column 8, as well as all other fractionating columns or towers hereafter referred to is provided in its upper section with a condenser whereby reflux may be formed and passed downwardly through the column to scrub ascending vapors. Such reflux system incorporated in a tower is conventional and therefore is not indicated in connection with the towers shown in the drawing.

The gaseous mixture from the top of separator 2 is passed through pipe 32, valve 33, and pipe 34 into supply line 18. Other refinery gases containing polymerizable materials may be treated in accordance with our invention, by introducing them into our system through pipe 16, pump 4a, and valve 17 into supply line 18. The mixture of gases from the separator, and refinery gases are passed through line 18 into the lower part of absorption tower 19. An absorbent oil, for example, gas oil, is supplied to the top of tower 19 through pipe 20, pump 21, valve 21a and pipe 22.

The gases introduced into the lower part of tower 19 pass upwardly countercurrent to the downflowing absorbent oil. The pressure and temperature conditions under which tower 19 is operated are substantially the same as those under which separator 2 is operated. As a result of the countercurrent passage within the tower 19, the gaseous mixture is stripped of substantially all of its $C_4$ hydrocarbons and heavier materials, which are absorbed by the oil. The stripped gases which comprise substantially all of the $C_2$ and $C_3$ hydrocarbons, methane, hydrogen, and only a very small quantity of the $C_4$ hydrocarbons, leave the top of tower 19 through pipe 35 and valve 36, and are passed to storage or otherwise disposed of.

The oil containing the $C_4$ and heavier hydrocarbons is passed from the bottom of tower 19 through pipe 23, surge tank 23a, pump 24, and pipe 25 into fractionating column 26. This column is provided with a reboiling coil 9a, and is operated at a bottom temperature of approximately 375° F., and under a pressure of approximately 15 lbs. per sq. inch. In this tower the absorbed gases are removed from the oil and are passed from the top thereof through line 37, condenser 38, pipe 39, and are forced by means of pump 40 through line 41 into line 14 and mix tank 15.

The oil from which the gases have been removed is passed from the lower part of tower 26, through line 27, and is forced by means of pump 28 through line 29, which has heat exchanger 29a interposed therein, valve 30, lines 31 and 22, back into tower 19.

The mixture present in mix tank 15 comprises some unstable light gasoline, together with some $C_2$ and $C_3$ hydrocarbons, methane, hydrogen, nitrogen and water, as well as the $C_4$ hydrocarbons. This mixture is passed from the bottom of mix tank 15 through pipe 42 and by means of pump 43 is passed through pipe 44 into stabilizer 45. This stabilizer is provided with a reboiling coil 9c, and is operated at a bottom temperature of about 345° F., and a pressure of the order of 200 lbs. per sq. in. Stabilized gasoline is withdrawn from the bottom of stabilizer 45 through valve-controlled line 44a, and is substantially free from $C_4$ and lighter hydrocarbons. Such gasoline may be cooled by conventional means and passed to storage, not shown in the drawing, or may be blended with de-butanized gasoline, and butane as hereinafter described.

The gases comprising $C_4$ and lighter hydrocarbons, hydrogen, nitrogen, and water are passed from the top of stabilizer 45 at a temperature of about 100° F., and under the pressure of the stabilizer, and are conducted through line 46, valve 46b, condenser 47, pipe 48, and by means of pump 49 are passed through pipe 50 into fractionating or "dehydrating" tower 51. This tower is provided at its lower end with a reboiling coil 9d, and is operated at a bottom temperature of about 240° F., and under a pressure of the order of 300 lbs. per sq. inch. In such tower the $C_4$ hydrocarbons are separated from the $C_2$ and $C_3$ hydrocarbons, methane, hydrogen, nitrogen, and water. The $C_4$ hydrocarbons pass as a liquid from the bottom of the tower through line 54 controlled by valve 54a, while the gaseous materials from which the $C_4$ hydrocarbons have been separated pass from the top of the tower through line 52 controlled by valve 53, and are conducted to storage or otherwise suitably disposed of.

It may be found desirable to operate in such a manner as to eliminate passage of the gases from the top of stabilizer 45, through a tower such as 51. In such instance, the $C_4$ fraction may be taken as a side stream from stabilizer 45, through pipe 78, valve 79, pipe 80, and passed by means of pump 81 through pipe 82 into pipe 55. The hydrocarbons lighter than $C_4$, along with hydrogen, nitrogen and water vapors, in such instance, will be passed from the system through the top of stabilizer 45 by means of valve controlled extension 46a, the valve 46b in line 46 being closed.

The $C_4$ hydrocarbon fraction substantially free from other materials is passed through pipe 55 into cooler 56, and thence through pressure reducing valve 57, whereupon its pressure is reduced from approximately 300 lbs. per sq. in. to approximately 50 lbs. per sq. inch. Such fraction then passes as vapor into polymerizing chamber 59 by means of pipe 58. Chamber 59 is packed with an inert filler 60, such as coke, pumice or other material which will provide a large contact surface and over which flows a descending stream of catalyst, as for example, sulfuric acid of from 70% to 80% concentration. The $C_4$ hydrocarbon fraction, introduced at the bottom of the chamber through pipe 58, passes upwardly countercurrent to the catalyst and in intimate contact therewith. The acid catalyst is maintained at a temperature of from about 90° F. to about 130° F., and polymerization of the unsaturated $C_4$ hydrocarbons, particularly iso-butene, is effected. The catalyst and liquid polymers are withdrawn from the bottom of chamber 59 through pipe 69, valve 70 and pipe 71 into separator 72 in which a separation of the immiscible polymers and the acid catalyst is effected. The polymers, being of lower specific gravity than the catalyst, rise to the top of the separator and are removed therefrom through valve-controlled pipe 73, or the polymers may be blended with de-butanized gasoline or stabilized gasoline as hereinafter set forth.

The separated catalyst is drawn from the bottom of the separator 72 through pipe 75 and is passed by pump 76 through pipe 77 and cooler 77a into the top of chamber 59 for recycling. The butanes and unpolymerized butenes, substantially free of iso-butene, are passed from the top of chamber 59 at a temperature of the order of 100° F., and at a pressure of 50 lbs. per sq. inch, through pipe 61, valve 62 and pipe 63 into separator 64 wherein any entrained polymers are separated and withdrawn from the bottom by means of valve-controlled extension 67. The unpolymerized $C_4$ hydrocarbons, in the vapor phase, are passed from the top of separator 64 through valve 65 and pipe 66 into the bottom of polymerization chamber 68. This chamber, similar to chamber 59, is likewise provided with an inert filler material 83, over which flows the catalyst, as for example, sulfuric acid of 80% to 90% concentration. The remaining unpolymerized butenes, substantially free of iso-butene, are passed upwardly countercurrent to the descending stream of catalyst, at a temperature of from about 90° F. to 150° F., and at a pressure of slightly less than 50 lbs. per sq. inch. The acid catalyst and liquid polymers are withdrawn from the bottom of the chamber through pipe 90 and valve 91 into separator 92, wherein the acid and polymers are allowed to separate, the polymers being drawn from the top of the separator by means of valve-controlled extension 93. The acid catalyst, settling to the bottom of separator 92 is pumped from line 94 by pump 95 through pipe 96, cooler 97, and pipe 98 into the top of chamber 68 for recycling. The remaining unpolymerized butenes and butane is passed from the top of chamber 68 through pipe 84, cooler 85, and pipe 86 into separator 87. The partially liquefied $C_4$ hydrocarbons, still under pressure and at a temperature of about 50° F., are separated from the uncondensed vapors, and the liquid butane, containing a small quantity of unpolymerized butenes, may be passed from the bottom of separator 87 by means of valve-controlled extension 89 to storage, not shown, or may be blended with the de-butanized gasoline or the stabilized gasoline to correct the volatility thereof. Any uncondensed butane and/or butene is withdrawn from the top of separator 87 through valve-controlled line 88, and may be used as fuel or otherwise disposed of. The liquefied butane and/or butene may be blended with the stabilized gasoline from the bottom of tower 45 and/or from the bottom of tower 8 in such quantities that the ultimate blend or product will have a satisfactory or desired vapor pressure, or may be utilized as liquid fuel. By blending with the thus formed gasoline of proper volatility specifications, the polymers formed in the catalytic treatment, we obtain the maximum yield of high anti-detonation value motor fuel from the products of the cracking process, since the butenes which would normally be present in a gasoline produced in the usual manner have been removed and polymerized, and have been replaced by unpolymerizable butane.

As hereinbefore stated, the debutanized gasoline from column 8, the stabilized gasoline from column 45, the polymerized butenes from separators 64, 72 and 92, and the liquefied butane from separator 87 may all be withdrawn from the system and passed to storage.

However, in the preferred method of operation, the de-butanized gasoline is blended with stabilized gasoline in the proportions in which they occurred in the initial cracked distillate, and such blend is then admixed with varying proportions of the butene polymers and liquefied butane to bring the final gasoline blend up to specification, particularly with respect to volatility or distillation range. By operating in this manner, substantially all of the polymerizable butenes are converted into useful compounds which may be incorporated in the gasoline without rendering the same too volatile, which would normally result if the butenes were added per se.

In blending the various streams, the de-butanized gasoline, in the desired proportion, is drawn from the bottom of column 8 and is passed by means of pipe 10 and valve-controlled pipe 99 into pipe 100, while stabilized gasoline is withdrawn from the bottom of column 45 and passed by valve-controlled pipe 101 into pipe 100. The combined streams may be passed through pipes 100 and 102 and withdrawn from the system by means of valve-controlled pipe 103. Simultaneously or subsequently iso-butene polymers may be passed from either or both of separators 64 and 72, by means of valve-controlled pipes 104 and/or 105, and blended with the gasoline stream from pipe 102. In addition there may be added the butene polymers from separator 92, by means of valve-controlled pipe 106, and the required quantity of liquefied butane from separator 87, by means of valve-controlled pipe 107. Thus the various streams, including gasoline, polymers and butane, may be blended in any desired proportion to produce a finished gasoline having the proper volatility or vapor pressure.

We have found that by treating the more reactive of the butenes, i. e., iso-butene, in the first stage of polymerization, with acid of 70 to 80% concentration, we were able to convert substantially all of the iso-butene into desirable polymers, with a minimum loss by over-polymerization to heavier polymers. The less reactive butenes which are not polymerized to any great extent by the 70 to 80% sulfuric acid are then passed to the second stage of polymerization, wherein they are treated with 80 to 90% sulfuric acid and converted into desirable polymers suitable for use as motor fuel.

In the foregoing description, mention is made of specific temperatures and pressure in the various steps of our process. However, it is to be understood that we do not intend to be limited thereby, but may employ such temperatures and pressures as may be necessary for economical operation, the conditions being dependent upon the character of the charging gases and other factors. It is also to be understood that the step of polymerization need not be carried on in a countercurrent catalytic system; said polymerization may be effected by passing the $C_4$ hydrocarbons through a column or body of catalyst, for example, sulfuric acid of 60 to 90% concentration, maintained at a suitable temperature and under suitable pressure.

Furthermore, while herein, by way of illustration, we have described the separation of the $C_4$ and heavier hydrocarbon fractions from the separator and/or other refinery gases by means of selective absorption with a hydrocarbon oil, such as for example, gas oil, we may employ any conventional method for separating the $C_4$ and heavier fractions from other undesirable hydrocarbons or gases, i. e., fractionation of the gases under elevated pressures in a fractionating coluumn, or selective adsorption by means of solid adsorbents such as charcoal, silica gel, or the like.

And, while herein we have described particularly the polymerization of the butenes by means of a catalyst such as sulfuric acid, we do not intend to limit overselves thereto, but may employ other catalysts at normal or elevated temperatures and pressures, or we may effect the desired polymerization by thermal treatment, for example, at temperatures within the range of from about 700° F. to about 1200° F. and preferably under superatmospheric pressures of the order of from about 200 to about 3000 lbs. per sq. inch. Thus, we may effect polymerization by catalytic or thermal treatment, or by any other suitable method.

For brevity, in the appended claims, the term "$C_4$" is to be understood to refer to hydrocarbons containing 4 carbon atoms to the molecule.

What we claim is:

1. The process of producing a high yield of high antiknock motor fuel of desired volatility which comprises initially separating cracked gasoline from the uncondensed gases formed during cracking, distilling from said cracked gasoline substantially all constituents and dissolved gases lower boiling than the $C_5$ hydrocarbons to produce debutanized gasoline, separating from the products distilled from the cracked gasoline the $C_4$ hydrocarbons, subjecting said $C_4$ hydrocarbons to polymerization, separating unpolymerized $C_4$ hydrocarbons from the polymers thus formed, blending debutanized gasoline and polymers and adding sufficient unpolymerized $C_4$ hydrocarbons to produce a high antiknock motor fuel of desired volatility.

2. The process of producing a high yield of high antiknock motor fuel of desired volatility which comprises initially separating cracked gasoline from the uncondensed gases formed during cracking, distilling from said cracked gasoline substantially all constituents and dissolved gases lower boiling than the $C_5$ hydrocarbons to produce debutanized gasoline, separating from the products distilled from the cracked gasoline and from the uncondensed gases the $C_4$ hydrocarbons, subjecting said $C_4$ hydrocarbons to polymerization, separating unpolymerized $C_4$ hydrocarbons from the polymers thus formed, blending debutanized gasoline and polymers and adding sufficient unpolymerized $C_4$ hydrocarbons to produce a high antiknock motor fuel of desired volatility.

3. The process of producing the maximum yield of high antiknock motor fuel of desired volatility which comprises initially separating cracked gasoline from the uncondensed gases formed during cracking, distilling from said cracked gasoline substantially all constituents and dissolved gases lower boiling than the $C_5$ hydrocarbons to produce debutanized gasoline, recovering from the uncondensed gas the heavier constituents thereof and adding them to the products distilled from the cracked gasoline, separating $C_4$ hydrocarbons and more volatile components from the mixture thus formed to produce a stabilized light gasoline, separating $C_4$ hydrocarbons from said more volatile components, subjecting said $C_4$ hydrocarbons to polymerization, separating unpolymerized $C_4$ hydrocarbons from the polymers thus formed, blending debutanized gasoline, stable light gasoline, and polymers and adding sufficient unpolymerized $C_4$ hydrocarbons to produce a high antiknock motor fuel of desired volatility.

4. The process of producing a high yield of high antiknock motor fuel of desired volatility which comprises initially separating cracked gasoline from the uncondensed gases formed during cracking, distilling from said cracked gasoline substantially all constituents and dissolved gases lower boiling than the $C_5$ hydrocarbons to produce debutanized gasoline, subjecting $C_4$ hydrocarbons contained in said distilled constituents and dissolved gases to polymerization, separating unpolymerized hydrocarbons from the polymers thus formed, blending debutanized gasoline and polymers and adding sufficient $C_4$ hydrocarbons to produce a high antiknock motor fuel of desired volatility.

FRED M. CLOTHIER, Jr.
HUGH W. FIELD.